United States Patent [19]

Handa et al.

[11] Patent Number: 4,887,255
[45] Date of Patent: Dec. 12, 1989

[54] INTEGRATED OPTICAL HEAD

[75] Inventors: Yuichi Handa; Masahiro Okuda; Hiroshi Osawa, all of Atsugi, Japan

[73] Assignee: Canon Kabushiki Kaisha, Tokyo, Japan

[21] Appl. No.: 87,516

[22] Filed: Aug. 20, 1987

[30] Foreign Application Priority Data

Aug. 25, 1986 [JP] Japan .................................. 61-197382

[51] Int. Cl.4 .......................... G11B 7/135; G02B 6/12
[52] U.S. Cl. .................................... 369/112; 369/122; 350/96.12
[58] Field of Search ..................... 369/44–46, 369/110–112, 120–122; 350/96.11–96.14, 96.18, 96.19

[56] References Cited

U.S. PATENT DOCUMENTS

| 4,425,023 | 1/1984 | Matsumoto et al. | 350/96.14 |
| 4,453,801 | 6/1984 | Verber et al. | 350/96.12 |
| 4,470,661 | 9/1984 | Matsumoto | 350/96.13 |
| 4,523,803 | 6/1985 | Arao et al. | 350/96.13 |
| 4,693,548 | 9/1987 | Tsunoi | 350/96.13 |
| 4,747,090 | 5/1988 | Yamashita et al. | 369/45 |
| 4,760,569 | 7/1988 | Mahlein | 350/96.19 |

FOREIGN PATENT DOCUMENTS 58-130448 8/1983 Japan .

Primary Examiner—Aristotelis M. Psitos
Assistant Examiner—James E. Tomassini
Attorney, Agent, or Firm—Fitzpatrick, Cella, Harper & Scinto

[57] ABSTRACT

An integrated optical head includes a substrate and an optical waveguide formed on a surface of one side of a substrate. Light is directed to the optical waveguide and a grating structure is provided for deflecting light propagating in the optical waveguide toward the substrate. A distributed refractive index lens is formed in the substrate for condensing the light passing through the substrate after the deflection toward an article.

9 Claims, 2 Drawing Sheets

INTEGRATED OPTICAL HEAD

BACKGROUND OF THE INVENTION

1. Field of the Invention

The present invention relates to an integrated optical head, and more particularly to an integrated optical head which is suitably used in an optical information recording and reproducing apparatus such as an optical disk memory.

2. Related Background Art

In the optical information recording and reproducing apparatus such as optical disk memory or opto-magnetic disk memory, an optical head is used to irradiate light for recording and reproducing information to and from a record medium and detect a light from the record medium. A conventional optical head uses a bulk type head having various optical parts including lenses and splitters arranged in alignment.

Since such bulk type optical head has a limitation on size reduction, it cannot fully meet a size reduction requirement. The bulk type optical head needs assembling and adjustment of optical parts in the manufacture thereof, and it is hard to prepare the heads of uniform performance.

In order to enhance the compactness and reliability, the optically integrated optical head has been recently proposed. For example, U.S. application Ser. No. 825,695 (Continuation of U.S. Ser. No. 482,894), FIG. 6 and page 13, lines 5-18, and U.S. application Ser. No. 651,780, FIG. 1B and page 2, line 16 to page 3, line 15 show and describe the optical information recording apparatus which use the integrated optical heads.

FIG. 1 shows a perspective view of a conventional integrated optical head. Numeral 2 denotes a substrate on which an optical wave guide 1 is formed. A grating coupler 30 having a light focusing function is formed on the surface of the optical wave guide. Numeral 3 denotes a semiconductor laser which serves as a light source. The laser is coupled to an end surface of the optical wave guide 1.

In this optical head, a laser beam from the semiconductor laser 3 is coupled to a diverging guided wave 31 in the optical wave guide 1 by the end surface coupling. When the diverging guided wave reaches the focusing grating coupler 30, it is coupled by the coupler to a focusing light 32 which propagates in a space. An exit focusing light in focused to a predetermined point S in the space as shown in FIG. 1. By arranging an information record medium at the point S, the light beam is spot-irradiated thereto.

While not shown, a reflected light from the information record medium is also coupled to the guided wave in the optical wave guide 1 by a focusing grating coupler (not shown) and detected by a photodetector (not shown).

In the conventional integrated optical head, very high precision is required to prepare the focusing grating coupler which can produce a light spot close to a diffraction limit, and hence it is difficult to attain a high precision optical head because of manufacturing tolerance.

Further, even if the focusing grating coupler is manufactured with high precision, it is very difficult to attain ideal use condition thereof. Since a large aberration is created due to deviations of an incident angle of incident light to the grating coupler, a wavelength of the incident light and an incident point of the incident light, it is very difficult to attain high light focusing performance.

SUMMARY OF THE INVENTION

It is an object of the present invention to provide an integrated optical head which has high optical performance, is easy to manufacture and does not loose an advantage of the optical integrated circuit, that is, compactness.

The above object of the present invention is achieved by an integrated optical head comprising a substrate, an optical wave guide formed on a surface of one side of the substrate, means for directing a light to the optical wave guide, a grating structure for deflecting the light propagating in the optical wave guide toward the substrate, and a distributed refractive index lens formed in the substrate to condense the light passing through the substrate after deflection onto an article.

DETAILED DESCRIPTION OF THE PREFERRED EMBODIMENTS

Figure 1:
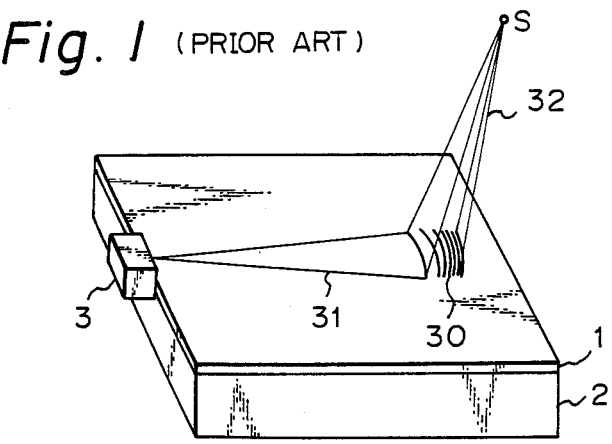
FIG. 1 shows a perspective view of a prior art integrated optical head.
Figure 2A:
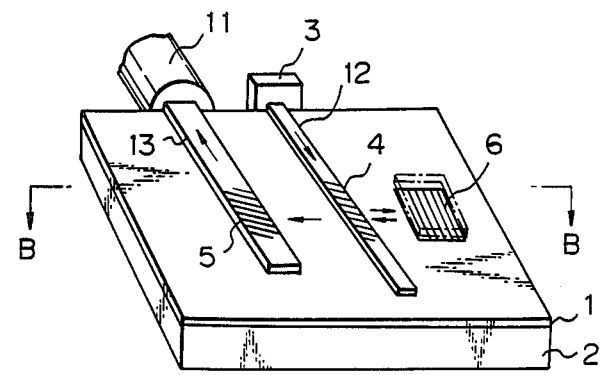
FIGS. 2A and 2B show perspective view and sectional view of one embodiment of the integrated optical head of the present invention.
Figure 2B:
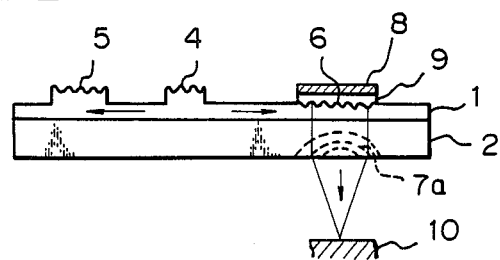

FIG. 2A shows a perspective view of a first embodiment of the integrated optical head of the present invention, and FIG. 2B shows a sectional view thereof taken along a line B-B. Numeral 2 denotes a glass substrate and numeral 1 denotes a slab optical wave guide having a higher refractive index than that of the substrate and formed on the surface of the substrate. Two parallel channel optical wave guides 12 and 13 are formed in a portion of the slab optical wave guide. Gratings 4 and 5 are formed in portions of the channel optical wave guides, respectively. A grating structure 6 of a constant pitch is formed on the surface of the slab optical wave guide. A dielectric buffer layer 9 such as polymethylmethacrylate (PMMA) and a metal or multi-layer reflection layer 8 such as Al layer are formed on the grating structure.

One end of each of the channel optical wave guides 12 and 13 extends to an end surface of the slab optical wave guide 1, and the semiconductor laser 3 which serves as the light source is connected to the end surface of the one channel optical wave guide 12 while one end of an optical fiber 11 is connected to the end surface of the other channel optical wave guide 13. While not shown, a photo-detector is connected to the other end of the optical fiber 11.

As shown in FIG. 2B, a distributed refractive index lens 7a is formed on the other side of the substrate 2 at a position corresponding to the grating structure 6. The lens 7a has a light focusing property. Numeral 10 denotes an information record medium.

In the present embodiment, the slab optical wave guide 1 and the channel optical wave guides 12 and 13 may be manufactured by forming an optical wave guide having a high refractive index on the entire surface of the substrate 2, masking only the channel optical wave guide areas by photo-lithography technique and etching it by a predetermined thickness by dry etching using an ion beam.

The reflection layer structure in the present embodiment may be manufactured by forming a buffer layer by spinner application method and then forming a reflection layer by vapor deposition.

The distributed refractive index lens 7a in the present embodiment may be manufactured by forming a mask by photo-lithography technique on the surface of the glass substrate 2, and heat-treating it in a molten salt such as $AgNO_3$ or $TlNO_3$ so that monad ions such as Na ions in the glass substrate 2 and monad ions such as Ag ions or Tl ions in the molten salt are ion-exchanged (ion exchange method). In this manner, a lens having a desired refractive index distribution and high performance is prepared.

In the present embodiment, the light beam from the semiconductor laser 3 is coupled to the channel guided wave which propagates in the channel optical wave guide 12 in the direction of the arrow. The channel guided wave reaches the grating 4 where it is Bragg-diffracted and coupled to the slab guided wave which propagate rightward in the slab optical wave guide 1 in the direction of the arrow. The slab guided wave propagates to the grating structure 6 with a width corresponding to the length of the grating 4 along the length of the channel optical wave guide 12. The grating structure has a width corresponding to a width of the slab guided wave. The grating structure 6 has the reflection layer structure including the buffer layer 9 and the reflection layer 8. By designing the reflection layer structure so that it essentially meets a phase matching condition, the slab guide wave is diffracted toward the substrate 2 at a very high efficiency. The grating structure having such reflection layer structure is disclosed in Japanese Patent Laid Open Application No. 224927/1985. The slab guided wave is coupled to the collimate light beam travelling downward in the substrate 2. The collimate light beam reaches the distributed refractive index lens 7a and is focused thereby and exits from the substrate 2 to form a spot on the record medium 10.

The reflected light from the information record medium 10 reversely travels along the path, and is coupled to the slab guided wave which passes through the distributed refractive index lens 7a and the grating structure 6 and propagates leftward in the slab optical wave guide 1 in the direction of the arrow. The slab guided wave reaches the grating 5 of the channel optical wave guide 13 and is Bragg diffracted thereby and coupled to the channel guided wave which propagates in the channel optical wave guide 13 in the direction of the arrow. The channel guided wave is directed into the optical fiber 11 by the end surface coupling and transmitted to the photodetector (not shown).

In recording the information, the light beam from the semiconductor laser 3 is modulated by the record signal so that the information is recorded on the information record medium 10. In reproducing the information, the intensity of the light beam from the semiconductor laser 3 is kept constant and the information recorded on the information record medium 10 is detected by the photodetector to reproduce the information.

In the present embodiment, the channel optical wave guides 12 and 13 and the gratings 4 and 5 formed thereon are used to couple the light beam from the light source to the slab guided wave or couple the slab guided wave to the output light directed to the photodetector. This construction can reduce a light path length compared to that in a construction which uses a wave guide lens and it can be manufactured more easily because the positional precision of the components is less severe. Thus, a design freedom is larger. The grating structure for coupling the guided wave and the channel guided wave is shown and described in U.S. application Ser. No. 930,250, FIG. 3 and page 4, line 6 to page 5, line 10.

Figure 3:
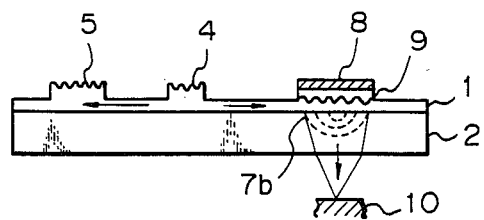
FIG. 3 shows a sectional view of another embodiment of the present invention.

FIG. 3 shows a sectional view of a second embodiment of the integrated optical head of the present invention. The like elements to those shown in FIG. 2B are designated by the like numerals and detailed description thereof is omitted.

The present embodiment differs from the first embodiment only in that the distributed refractive index lens 7b is on the side of the substrate 2 which faces the grating structure 6.

Figure 4:
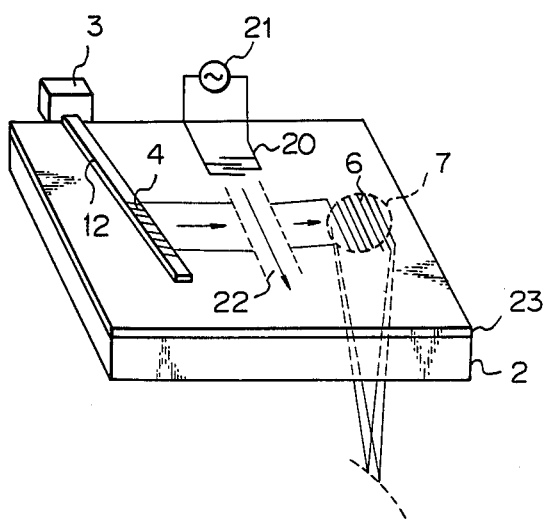
FIG. 4 shows a sectional view of a further embodiment of the present invention.

FIG. 4 shows a perspective view of a third embodiment of the integrated optical head of the present invention. The like elements to those shown in FIG. 2 are designated by the like numerals. Numeral 23 denotes a slab optical wave guide formed on the surface of the substrate 2 and made of a piezoelectric material such as ZnO. A channel optical wave guide 12 is formed on a portion of the slab optical wave guide, and interdigital electrodes 20 for exciting a surface acoustic wave 22 shown by an arrow is formed on a slab optical wave guide 23 provided between a grating 4 which is formed on a portion of the channel optical wave guide and a grating structure 6 formed on the surface of the slab optical wave guide 23. Numeral 21 denotes a power supply for applying an HF signal to the interdigital electrodes 20.

In the present embodiment, a surface acoustic wave 22 excited by the interdigital electrodes 20 acts as a diffraction grating to the slab guided wave which is diffracted by the grating 4 and propagates rightward in the direction of the arrow toward the grating structure 6 so that the guided wave is deflected by an angle determined by a period of the diffraction grating or a wavelength of the surface acoustic wave 22. Accordingly, in the present embodiment, the guided wave can be directed to the grating structure 6 at a continuously varying incident angle by changing the frequency of the HF signal supplied from the power supply. In this manner, the position of the light spot focused by the distributed refractive index lens 7 in the substrate 2 can be continuously changed to attain tracking function.

The present invention is applicable to other than the embodiments described above. For example, the wave guides and gratings are not limited to those shown in the embodiments but they may be of different materials or prepared by different methods. The present invention covers all such modifications without departing from the scope of the claim.

What is claimed is:

1. An integrated optical head comprising:
   a substrate;
   an optical waveguide formed on a surface of one side of said substrate;
   directing means for directing a light to said optical waveguide;
   a grating structure for deflecting a light propagating in said optical waveguide toward said substrate; and a distributed refractive index lens formed in said substrate for condensing the light passing through said substrate after the deflection toward an article.

2. An integrated optical head according to claim 1, wherein said optical wave guide is a slab optical wave guide.

3. An ingreated optical head according to claim 2, wherein said directing means includes a channel optical wave guide formed on said slab optical wave guide, a grating coupler formed on said channel optical wave guide and a light source connected to one end of said channel optical wave guide.

4. An integrated optical head according to claim 1, wherein said grating structure has a dielectric buffer layer and a reflection layer formed thereon.

5. An integrated optical head according to claim 1, wherein said substrate is made of glass and said distributed refractive index lens is formed by an ion exchange method.

6. An integrated optical head according to claim 1 further comprising light scan means for scanning the light propagating in said optical wave guide.

7. An integrated optical head according to claim 6, wherein said light scan means includes interdigital electrodes formed on said optical wave guide and a variable frequency power supply for applying an HF signal to said interdigital electrodes to excite a surface acoustic wave in said optical wave guide.

8. An integrated optical head according to claim 1 further comprising output means for outputting the light reflected by said article and redirected into said optical wave guide through said distributed refractive index lens and said grating structure.

9. An integrated optical head according to claim 8, wherein said optical wave guide is a slab optical wave guide, and said output means includes a channel optical wave guide formed on said slab optical wave guide and a grating coupler formed on said channel optical wave guide for coupling the light propagating in the slab optical wave guide to the channel optical wave guide.

* * * * *

UNITED STATES PATENT AND TRADEMARK OFFICE
CERTIFICATE OF CORRECTION

PATENT NO. : 4,887,255
DATED : December 12, 1989
INVENTOR(S) : YUICHI HANDA ET AL.

It is certified that error appears in the above-identified patent and that said Letters Patent is hereby corrected as shown below:

COLUMN 2

Line 7, "loose" should read --lose--.

COLUMN 4

Line 58, "claim." should read --claims.--.

COLUMN 5

Line 8, "inegreated" should read --integrated--.

Signed and Sealed this

Twentieth Day of August, 1991

*Attest:*

HARRY F. MANBECK, JR.

*Attesting Officer*　　　*Commissioner of Patents and Trademarks*